United States Patent Office 2,830,399
Patented Apr. 15, 1958

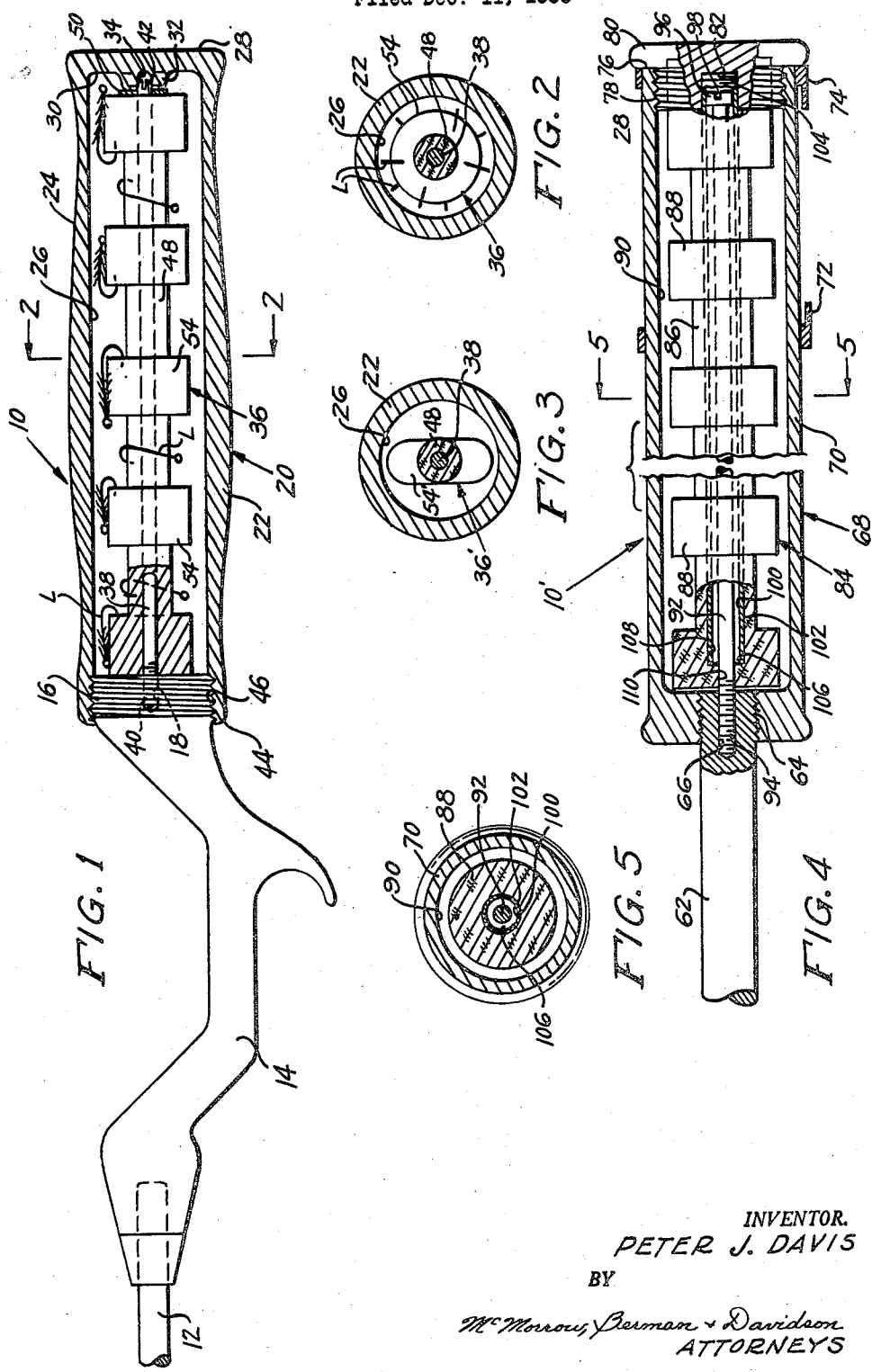

2,830,399
FISHING ROD ASSEMBLY
Peter Joseph Davis, Camden, Ark.

Application December 11, 1956, Serial No. 627,583

4 Claims. (Cl. 43—23)

This invention relates to improvements in fishing rods having storage handles.

The primary object of the invention is to provide more practical and efficient fishing rods of this kind whose handles are readily removable and replaceable and whose lure storage members are readily exposed for access to lures impaled therein, and are readily manipulated to enclosed storage positions, the construction being simple, and composed of a small number of simple and readily assembled parts.

Another object of the invention is to provide fishing rods of the character indicated above which can be made in well-finished, rugged, and serviceable forms at relatively low cost.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a fragmentary side elevation of a fishing rod of the invention, the handle thereof being shown in longitudinal section and parts being broken away;

Figure 2 is a transverse section taken substantially on the plane of line 2—2 of Figure 1;

Figure 3 is a section similar to Figure 2, showing an alternate embodiment of structure utilized in the invention;

Figure 4 is a fragmentary side elevation similar to Figure 1, showing another embodiment of the invention; and Figure 5 is a transverse section taken substantially on the plane of line 5—5 of Figure 4.

Referring to the drawing in detail, and first to Figures 1 and 2, there is shown a fishing rod assembly, of the "casting reel" type, indicated generally at 10, comprising a rod 12 secured at one end in any suitable manner to a mounting portion 14 for a casting reel (not shown), said portion 14 terminating at its rear end in an externally threaded boss 16 extending substantially axially relative to the rod 12. The boss 16 incorporates an axial threaded bore 18. Indicated generally at 20 is a hollow storage handle assembly, removably secured on the boss 16.

The handle assembly 20 comprises a tubular handle grip 22 whose outer side 24 is suitably formed for a comfortable grip. The hand grip 22 incorporates a storage compartment 26. The hand grip 22 has a closed rear end wall 28 having on the inner surface thereof a forwardly extending central boss incorporating a blind bore 34 in axial alignment with the bore 18 of the boss 16.

Indicated generally at 36 is a holder disposed within the compartment 26 and providing means wherein fishhooks or the like may be impaled thereon and stored within the compartment 26. The holder 36 includes a longitudinal shaft 38 having a threaded forward end 40 threaded into the bore 18 of the boss 16. The rear end 42 of the shaft 38 is removably engaged in the bore 34 of the boss 32 on the rear end wall 28. The forward end 44 of the hand grip 22 has internal screw threads 46 removably threaded on the boss 16 of the reel mounting portion 14. Slidably circumposed on the shaft 38 is an elongated sleeve 48 which is retained thereon by means of a suitably secured washer 50 secured to the shaft near the rear end of the shaft. The sleeve 48 is preferably made of a suitable material, such as felt, rubber, or the like, which can be readily penetrated by the barbs of hooks of fish lures, fishhooks, or the like, indicated at L. The sleeve 48 is cylindrical, see Figure 2, and incorporates therein a plurality of longitudinally spaced cylindrical enlarged diameter blocks 54. The blocks 54 and the sleeve 48 provide a plurality of surfaces into which the barbed portions of the lures L may be impaled.

When the hand grip 22 is separated from the reel mounting portion 14 and is moved longitudinally away from the reel mounting portion 14, the shaft 38 remains secured to the reel mounting portion 14 so that the holder 36 is exposed and the lures impaled therein are readily accessible. Obviously, when the hand grip 22 is secured on the reel mounting portion 14 the lures L will be stored in a relatively dry and protected condition within the compartment 26.

In the form of the invention shown in Figure 3, the holder 36' incorporates a cylindrical sleeve 48' having thereon longitudinally spaced blocks 54' of oval rather than cylindrical shape. The oval blocks 54' of Figure 3 provide greater storage space for larger lines in the compartment 26 of the hand grip 22.

The form of the invention shown in Figures 4 and 5, indicated generally at 10', comprises a rod 62 having a threaded rear end 64 having thereon an axial internally threaded bore 66. Indicated generally at 68 is a handle assembly incorporating a hand grip portion 70 including, as is conventional, in spaced longitudinal relationship thereon cooperating portions 72 and 74 for mounting thereon a "fly casting" reel (not shown). The hand grip portion 70 incorporates in its rear end 76 an internally threaded portion 78 receiving therein a removable plug 80, said plug incorporating a central threaded recess 82 in axial alignment with the internally threaded bore 66 of the rod 62. Indicated generally at 84 is a holder comprising a tubular sleeve 86 having integral therewith a plurality of longitudinally spaced enlarged blocks 88, said enlarged blocks being similar to those previously mentioned relative to Figures 1 and 3. The hand grip 70 incorporates a storage compartment 90 therein, the holder 84 being longitudinally disposed within said storage compartment. The holder 84 incorporates a shaft 92 having a threaded forward end 94 threaded in the bore 66 of the rod 62, the holder 84 being circumposed on the shaft 92. The shaft 92 has on its rear end an enlarged head 96 having a diametrical slot 98 therein for receiving a screw driver blade therein. The head 96 is circular and received within the bore 100 of a tube 102 disposed within the sleeve 86 of the holder. The tube 102 has an externally threaded rear end 104 threaded in the threaded recess 82 in the plug 80. The bore 108 of the sleeve 86 of the holder 84 has a closed forward end 106.

Thus by rotating the plug 80 and removing the plug from the hand grip 70, the tube 102 may be moved longitudinally and removably out of the hand grip 70 so as to provide access to the holder 84 and the lures impaled therein. When the enlarged head 96 abuts the closed forward end 106 of the bore 108 of the sleeve 86 of the holder 84, rearward longitudinal movement of the plug 80 and the holder 84 is stopped. The bore 108 terminates at its forward end in a reduced diameter portion 110 through which the shaft 92 passes, as clearly seen in Figure 5.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed is:

1. A fishing rod assembly comprising a rod having a threaded boss on its rear end, a tubular hand grip having a rear end and a forward end, said forward end being threaded on said boss, said boss having therein a threaded axial bore, a longitudinal shaft extending in said hand grip, said shaft having a threaded forward end threaded in said bore and a rear end, an elongated lure holder within said hand grip comprising a tubular sleeve slidably circumposed on said shaft, and means acting between the rear end of the hand grip and said holder and retaining said holder in place within the hand grip.

2. A fishing rod assembly according to claim 1, wherein said holder has a closed rear end wall on its rear end having an axial socket in which the rear end of said shaft is engaged.

3. A fishing rod assembly according to claim 1, wherein the rear end of the hand grip is open, a plug threaded on and closing the open rear end of the hand grip, said plug having an axial threaded socket, and said holder having a threaded portion in its rear end threaded in said socket.

4. A fishing rod assembly according to claim 1, wherein the rear end of the hand grip is open, a plug threaded on and closing the open rear end of the hand grip, said plug having an axial threaded socket, and said holder having a threaded portion in its rear end threaded in said socket, said holder sleeve having an axial bore having a closed forward end and an open rear end at the rear end of the sleeve, a tube secured in said bore and having a rear end portion projecting rearwardly beyond the sleeve and constituting said threaded portion, said tube having a bore larger in diameter than and receiving said shaft, an enlarged stop head on the rear end of said shaft sliding in the bore of the tube, said head being engageable with the closed forward end of the bore of the sleeve when said plug is removed from the hand grip and the holder is moved rearwardly along the shaft relative to the hand grip to expose the holder.

References Cited in the file of this patent

UNITED STATES PATENTS

| 2,225,309 | Lawrence | Dec. 17, 1940 |
| 2,232,621 | Monroe | Feb. 18, 1941 |
| 2,693,662 | Norton et al. | Nov. 9, 1954 |

FOREIGN PATENTS

| 78,618 | Norway | May 28, 1951 |